US011409451B2

(12) United States Patent
Fisher et al.

(10) Patent No.: US 11,409,451 B2
(45) Date of Patent: Aug. 9, 2022

(54) SYSTEMS, METHODS, AND STORAGE MEDIA FOR USING THE OTHERWISE-UNUTILIZED STORAGE SPACE ON A STORAGE DEVICE

(71) Applicant: VeriBlock, Inc., Delray Beach, FL (US)

(72) Inventors: Justin Fisher, Delray Beach, FL (US); Maxwell Sanchez, Albuquerque, NM (US)

(73) Assignee: Veriblock, Inc., Delray Beach, FL (US)

( * ) Notice: Subject to any disclaimer, the term of this patent is extended or adjusted under 35 U.S.C. 154(b) by 211 days.

(21) Appl. No.: 16/656,737

(22) Filed: Oct. 18, 2019

(65) Prior Publication Data

US 2020/0125282 A1  Apr. 23, 2020

Related U.S. Application Data

(60) Provisional application No. 62/747,686, filed on Oct. 19, 2018.

(51) Int. Cl.
  *G06F 1/24* (2006.01)
  *G06F 3/06* (2006.01)
  *G06F 9/4401* (2018.01)

(52) U.S. Cl.
  CPC .......... *G06F 3/0632* (2013.01); *G06F 3/0604* (2013.01); *G06F 3/067* (2013.01);
  (Continued)

(58) Field of Classification Search
  CPC ...... G06F 3/0632; G06F 3/067; G06F 3/0659; G06F 3/0604; G06F 3/0619; G06F 3/0653; G06F 3/0643; G06F 3/0664
  (Continued)

(56) References Cited

U.S. PATENT DOCUMENTS 7,603,530 B1 * 10/2009 Liikanen ............. G06F 11/2084
                                                              711/156
9,740,408 B1 *  8/2017 Coleman ............... G06F 3/0688
(Continued)

OTHER PUBLICATIONS

International Searching Authority, "International Preliminary Report on Patentability" for international application No. PCT/US2019/056874, dated Apr. 14, 2021.
(Continued)

*Primary Examiner* — Volvick Derose
(74) *Attorney, Agent, or Firm* — Rimon PC, Marc Kaufman (57) ABSTRACT

Systems, methods, and storage media for using the otherwise-unutilized storage space on a storage device without having a substantial effect on the normal operation of the storage device by one or more users accessing the storage device through one or more primary file organization architecture controllers of the storage device are disclosed. Implementations may: identify, by a secondary file organization architecture controller, logical units of separation present on the virtual storage device without affecting operation of the primary file organization architecture of the computer; identify unutilized storage space on at least one of the logical units of separation; cause auxiliary data to be stored store in the unutilized storage space; record, in a data storage associated with the secondary file organization architecture, the state of the auxiliary data without notifying the primary file organization architecture controller; and retrieve at least some of the auxiliary data without notifying the file organization architecture controller.

45 Claims, 2 Drawing Sheets

(52) U.S. Cl.
CPC .......... *G06F 3/0619* (2013.01); *G06F 3/0643* (2013.01); *G06F 3/0653* (2013.01); *G06F 3/0659* (2013.01); *G06F 9/4411* (2013.01)

(58) Field of Classification Search
USPC ........................................................ 713/100
See application file for complete search history.

(56) References Cited

U.S. PATENT DOCUMENTS

| | | | |
|---|---|---|---|
| 2002/0103996 A1 | 8/2002 | LeVasseur et al. | |
| 2005/0086294 A1* | 4/2005 | Kodama | G06F 16/10 709/203 |
| 2006/0095695 A1* | 5/2006 | Daniels | G06F 11/1471 711/162 |
| 2007/0277055 A1 | 11/2007 | Shen et al. | |
| 2008/0147754 A1* | 6/2008 | Littlefield | G06F 11/20 |
| 2009/0276588 A1* | 11/2009 | Murase | G06F 3/0647 711/160 |
| 2010/0023596 A1* | 1/2010 | Greatwood | G06F 16/10 709/213 |
| 2012/0005307 A1* | 1/2012 | Das | G06F 16/1727 709/219 |
| 2012/0096235 A1* | 4/2012 | Lehr | G06F 3/0631 711/171 |
| 2013/0073522 A1* | 3/2013 | Chen | G06F 16/182 707/687 |
| 2014/0281454 A1* | 9/2014 | Even | G06F 1/32 713/2 |
| 2015/0106410 A1* | 4/2015 | Zaltsman | G06F 16/1847 707/824 |
| 2016/0139836 A1* | 5/2016 | Nallathambi | G06F 11/1464 711/114 |
| 2018/0113623 A1* | 4/2018 | Sancheti | G06F 9/45558 |
| 2019/0278668 A1* | 9/2019 | Kochunni | G06F 11/1448 |

OTHER PUBLICATIONS

International Searching Authority, International Search Report and Written Opinion for International Application No. PCT/US19/56874 dated Jan. 14, 2020.

* cited by examiner

SYSTEMS, METHODS, AND STORAGE MEDIA FOR USING THE OTHERWISE-UNUTILIZED STORAGE SPACE ON A STORAGE DEVICE

FIELD OF THE DISCLOSURE

The present disclosure relates to using the otherwise-unutilized storage space on a storage device without having a substantial effect on the normal operation of the storage device by a user accessing the storage device through one or more primary file organization architectures of the storage device.

BACKGROUND

Storage devices consist of one or more discrete units of (generally but not necessarily non-volatile) storage (herein referred to as 'memory') to which data can be written to and read from. Generally, a discrete unit of memory is considered to be the smallest amount of memory which can be individually accessed (for writing, reading, erasing, etc.). Furthermore, many storage devices have one or more additional sections of one or more discrete units of memory which are held in reserve to be used as a replacement if a physical fault renders one or more discrete units of the primary memory unusable or otherwise unstable. Replacement is affected by the file organization architecture associated with the storage device. Normally, this replacement process occurs in a manner which is opaque or semi-opaque to the host system(s) which are interacting with the storage device. Until being repurposed in the replacement process, these reserved sections of memory may also be considered unutilized.

Ordinarily, a memory device has one or more associated file organization architectures (also known as a "file system" or "file system architecture") that defines the organization of the data on the memory device for communication with the operating system(s) and/or other software or firmware running on the computer controlling the memory device. For example, File Allocation Table (FAT) is a computer file system architecture supported by nearly all currently developed operating systems for personal computers and many mobile devices and embedded systems, and thus is a well-suited format for data exchange between computers and devices of almost any type and age from 1981 up to the present. During normal operation, storage devices generally contain at least one discrete unit of memory which does not contain data that the host system(s) will attempt to retrieve (due to this space being seen as "empty" and/or "unused" and/or "unaddressed") by the file system(s) present on the device. A file is any grouping of one or more discrete units of memory, may optionally only concern portions of the data contained in each discrete unit of memory, may address the same physical and/or virtual discrete units of memory as other files, and often has but don't necessarily require a particular order to the portions of discrete (potentially partial) units of memory which they address.

The concept of "empty" space on a storage device refers to one or more discrete units of memory which the host system(s) (generally through their interpretation of the locally-available file system(s)) and/or other uses of the device don't expect to contain any useful data. At the physical layer, the "empty" discrete unit(s) of memory generally do contain data, but this data is either 'nonsense' (such as one or more specific patterns of data written to the discrete unit(s) of memory by the manufacturer, and/or by the firmware running on the storage device or software running on the host system(s) in order to securely erase data, and/or the data patterns resulting from the default state of the physical storage medium), and/or 'unaddressed' (there are no longer any references in the file system(s) on the storage medium to the discrete unit(s) of memory which describe their contents as related to one or more files or other constructs of meaningful data storage). Multiple different layers of physical and virtual addressing/mapping may be present. These layers may be either dependent or independent of each other, or a mix of the two. For example, a storage device may have a physical addressing scheme where an address can map to different physical locations at different points in time, such that the mapping is opaque to addressing layers present above/atop it such as a standard file system. Analysis of one layer may reveal "empty" space which other layers recognize as used.

Generally, a storage device is divided into one or more "partitions." The partition table (or similar construction) of the storage device describes the sets of discrete unit(s) of memory which belong to each partition. Different partitions of varying sizes are often created on a particular storage device to serve the needs of the host system(s) or other users of the device, and these different partitions can contain different types of file systems, or no file system at all. Furthermore, file systems File systems (referred to as "file organization architectures") allow the host system(s) or other users of the device to understand what is stored on the partition, how to access items stored on the partition, how to write new data to the partition, how to communicate that new data has been written to the partition which represents something, how to determine how many discrete units of memory are "empty" and where those discrete units of memory are located, how to indicate that a particular item is no longer needed, and/or other additional necessary available (and possibly required) for interacting with the partition.

Discrete units of memory on a storage device which are "empty" as described above are seen by any protocol-adherent interpreter of the file system(s) and/or physical address mapping systems present on the partitions of the storage device to be of no consequence, such that the state of the data stored in the discrete unit(s) of memory could be changed without violating the expectations of the protocol-adherent file system and/or physical address mapping system interpreter(s). When additional data is written to the storage device, it is written to one or more of these empty discrete unit(s) of memory in conjunction with one or more updates to the file system's (or physical address mapping system's) records which now identify the previously-empty discrete unit(s) of memory as filled or occupied, and generally further identify these now-occupied discrete unit(s) of memory as portions of a data structure, such as a file, for which reconstitution requires knowledge about the process through which the data present in the now-occupied discrete unit(s) of memory should be interpreted.

Note that it is also possible for multiple entries in a file system or physical address mapping system to all point to one or more of the same discrete unit(s) of memory on the storage device (if part or all of the data referred to by an entry in the file system already exists on the storage medium) if the file system itself supports such behavior. In such an instance, deleting one or more file system references to a discrete unit of memory is not necessarily sufficient for determining that the discrete unit of memory is no longer used, as other references to said discrete unit of memory may still exist in the file system.

Different styles of file organization architectures can be created which provide various features and have different performance profiles, and most standard file organization architectures can be used on most storage devices, assuming the target partition is appropriately sized. However, certain file organization architectures are best suited for certain types of storage devices, and certain types of storage devices are unable to support certain file organization architectures. For example, a write-once optical disk cannot support a file system which allows multiple discrete overlapping write sessions.

SUMMARY

One aspect of the present disclosure relates to a system configured for using the otherwise-unutilized storage space on a storage device without having a substantial effect on the normal operation of the storage device by one or more users accessing the storage device through one or more primary file organization architecture(s) of the storage device. The system may include one or more hardware processors configured by machine-readable instructions. The processor(s) may be configured to identify logical units of separation present on the virtual storage device without substantially affecting operation of the primary file organization architectures used by any machine or other agent which reads data from, writes data to, or otherwise interacts with the storage device. The processor(s) may be configured to identify unutilized storage space on at least one of the logical units of separation. The processor(s) may be configured to cause auxiliary data to be stored in the unutilized storage space. The processor(s) may be configured to record, in a data storage associated with one or more secondary file organization architecture modules, the state of the auxiliary data without notifying or otherwise affecting the primary file organization architecture(s). The processor(s) may be configured to retrieve at least some of the auxiliary data without notifying one or more of the primary file organization architecture(s).

Another aspect of the present disclosure relates to a method for using the otherwise-unutilized storage space on a storage device without having a substantial effect on the normal operation of the storage device by one or more users accessing the storage device through one or more primary file organization architecture(s) of the storage device. The method may include identifying logical units of separation present on the virtual storage device without affecting operation of the primary file organization architecture of the computer. The method may include identifying unutilized storage space on at least one of the logical units of separation. The method may include causing auxiliary data to be stored store in the unutilized storage space. The method may include recording, in a data storage associated with one or more secondary file organization architectures, the state of the auxiliary data without notifying one or more of the primary file organization architecture(s). The method may include retrieving at least some of the auxiliary data without notifying one or more of the primary file organization architecture(s).

Yet another aspect of the present disclosure relates to a non-transient computer-readable storage medium having instructions embodied thereon, the instructions being executable by one or more processors to perform a method for using the otherwise-unutilized storage space on a storage device without having a substantial effect on the normal operation of the storage device by one or more users accessing the storage device through one or more primary file organization architecture(s) of the storage device. The method may include identifying logical units of separation present on the storage device without affecting operation of the primary file organization architecture(s) of the used by any users of the storage device, including but not limited to host computers. The method may include identifying unutilized storage space on at least one of the logical units of separation. The method may include causing auxiliary data to be stored in the unutilized storage space. The method may include recording, in a data storage associated with one or more secondary file organization architecture module(s), the state of the auxiliary data without notifying one or more of the primary file organization architecture(s). The method may include retrieving at least some of the auxiliary data without notifying one or more of the primary file organization architecture(s).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The embodiments described herein provide a novel system and method which enables the utilization of otherwise-unutilized storage capacity on a storage device while preserving most or all of the expected functionality of the storage device. The characteristics of how said otherwise-unutilized storage capacity is used (or expected to be used) can be modified to accommodate any acceptable level of interference which said reuse exerts on the performance (including but not limited to electrical consumption, data integrity, heat production, noise, wear, emission of radio waves, and/or production of light) of said storage device for other uses. The phrase "without having a substantial effect on normal operation of the storage device" and similar phrases, refer to the overall function of the storage device and does contemplate a certain level of reduced performance of the storage device. However, the reduce performance is minimized to not adversely affect the user experience. one of skill in the art would readily be able to balance any minimal impact on performance with user needs. In some instances, the embodiments described herein may be used to improve the performance by, for example, providing additional data integrity guarantees related to the one or more primary uses of the storage device.

Figure 1:
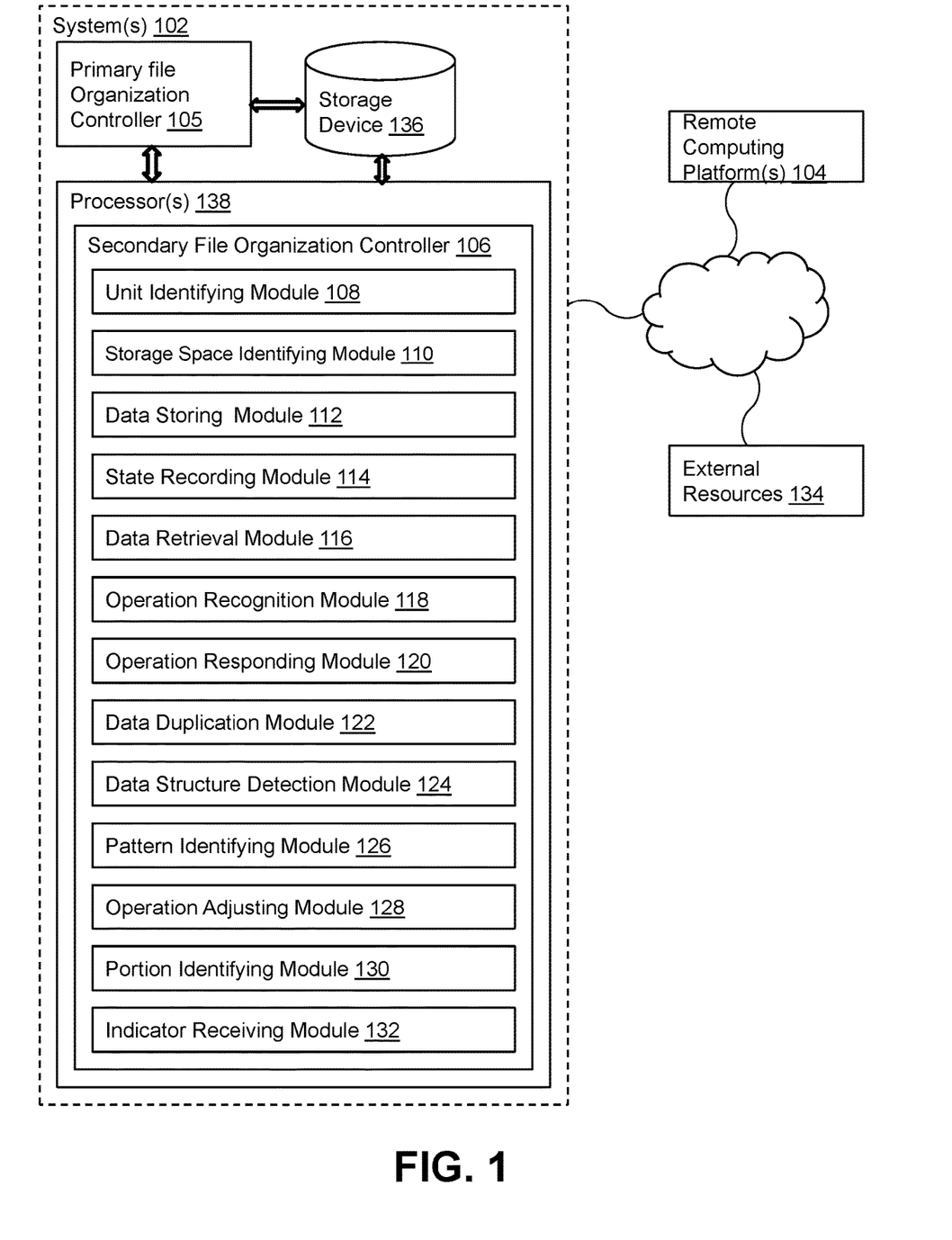
FIG. 1 illustrates a system configured for using the otherwise-unutilized storage space on a storage device in accordance with one or more implementations.

FIG. 1 illustrates a system 102 configured for using the otherwise-unutilized storage space on a storage device 136 without affecting normal operation of the storage device by one or more users accessing the storage device through a one or more primary file organization architecture(s) of the storage device, in accordance with one or more implementations. In some implementations, system 102 may be configured to communicate with one or more remote computing platforms 104 according to a client/server architecture and/or other architectures. Remote computing platform(s) 104 may be configured to communicate with other remote computing platforms via system 102 and/or according to a peer-to-peer architecture and/or other architectures. Users may access system 102 via remote platform(s) 104 or through local interface elements that are incorporated into system 102. External resources, such as information sources and other services, can also be coupled to system 102. Note that system 102 can include multiple devices and or computing platforms. Accordingly, storage device 136 and primary file organization architecture 105 need not be on the same physical device as secondary file organization architecture 106. In some embodiments, the secondary file organization architecture may be comprised of storage and/or functionality present on multiple discrete devices.

System 102 may be configured by machine-readable instructions which, along with processing hardware, define secondary file organization controller 106 of this implementation. The machine-readable instructions of secondary file organization controller 106 may include one or more modules which are components of the secondary file organization controller 106 and serve to define a secondary file organization architecture. The physical operation of some storage devices requires that a particular amount of memory is updated/read at a single time, even if the amount of data written to/stored in that amount of memory is only partially consumed. It is possible that an implementation of the disclosed systems/methods would be able to write data in the unused portions of these discrete memory segments, and maintain a secondary file system architecture capable of addressing portions of each discrete unit of memory. The modules may include computer program modules. The modules may include one or more of a unit identifying module 108, a storage space identifying module 110, a data storing module 112, a state recording module 114, a data retrieval module 116, an operation recognition module 118, an operation responding module 120, a data duplication module 122, a data structure detection module 124, a pattern identifying module 126, an operation adjusting module 128, a portion identifying module 130, an indicator receiving module 132, and/or other instruction modules. System 102 also includes a conventional primary file organization architecture, such as a FAT architecture, as the primary file organization architecture 105. Note that "primary file organization architecture", as used herein, refers to the standard file system that exists on the memory space of a memory device. A primary file organization controller controls reads and writes to the primary file organization architecture in a conventional manner. "Secondary file organization architecture", as used herein, refers to a secondary file system that is on portions of the memory device and which is subordinate to the primary file organization architecture. A secondary file organization controller manages reads and writes to the secondary file organization architecture without affecting the operation of, or notifying, the primary file organization architecture and controller. In the disclosed implementations, at least a portion of memory space of the memory device includes both the primary and secondary file organization architectures.

Unit identifying module 108 may be configured to identify logical units of separation present on virtual storage space of storage device 136 without affecting operation of the primary file organization architecture 105. Storage space identifying module 110 may be configured to identify otherwise-unutilized storage space on at least one of the logical units of separation. Note that "unused storage capacity" or, "unused storage space", and "otherwise-unutilized storage space" refers to discrete units of memory which are not currently referenced by the primary file organization architecture of storage device 136. Changes to the data present in the unused storage space will have no effect on primary file organization control or any other protocol-adherent interpreter of the file system. While units of memory generally do contain data (whether it be all zeroes, random garbage, and/or data which was 'deleted' by removing all references to it according to the specifications of the primary file system(s) in question), this data is considered empty by the primary file organization architecture controller 105 because it does not store data that the primary file organization architecture currently points to. However, primary file organization architecture controller 105 expects to be able to write data to unused storage space at any time, and modify the data of the file system(s) accordingly to represent that the previously-unused storage space is now used and accessible through one or more references stored by the primary file organization architecture.

Data storing module 112 may be configured to cause auxiliary data to be stored in the unutilized storage space of storage device 136. "Auxiliary data", as used herein, refers to any data that is read/written under management by the secondary file organization architecture controller 106. State recording module 114 may be configured to record, in a data structure associated with the secondary file organization architecture, the state of the auxiliary data without notifying the primary file organization architecture or affecting the operation of primary file organization architecture controller 105.

Data retrieval module 116 may be configured to retrieve at least some of the auxiliary data without notifying the primary file organization architecture or affecting the operation of primary file organization architecture controller 105. Operation recognition module 118 may be configured to recognize and incoming read, write, and/or other operations from the primary file organization architecture controller 105. Operation responding module 120 may be configured to respond to the read, write, and/or other operations detected by operation recognition module 118.

Data duplication module 122 may be configured to at least one of duplicate the auxiliary data or use parity algorithms to protect against overwriting or deleting the auxiliary data by primary file organization architecture controller 105. As noted above, the primary file organization architecture may include file allocation table architecture (FAT) or other types of file organization architectures. The primary file organization architecture controller 105 may be controlled by an operating system and/or other software or firmware operating on system 102. The operating system or firmware may include software that controls the execution of computer programs and may provide various services, according to some implementations. Examples of the operating system may include one or more of DOS, Unix, Windows, Mac OS and/or other operating systems. The primary file organization architecture and system 102 may be at least a portion of a network attached storage (NAS) architecture. Network-attached storage is a file-level computer data storage server connected to a computer network providing data access to a heterogeneous group of computing devices.

Data structure detection module 124 may be configured to detect that at least a portion of a data structure previously containing the auxiliary data was overwritten or removed. Pattern identifying module 126 may be configured to identify patterns of reads, writes, and/or other commands of the primary file organization architecture controller 105. Operation adjusting module 128 may be configured to adjust the operation of the secondary file organization architecture controller 106 based on the patterns of storage detected by data structure detection module. For example, operation adjusting module 128 may be configured to adjust the operation of the secondary file organization architecture controller 106 based on the at-risk portions of storage device 136, or based on the external indicators, such as messages from external resources 134. Portion identifying module 130 may be configured to identify at-risk portions of storage space on the storage device. Indicator receiving module 132 may be configured to receive external indicators.

Operation pattern identifying module 126 and adjusting module 128 can implement one or more of the following: a method or module for recognizing and responding to incoming writes to otherwise-unutilized space consumed by data written to said unutilized space and acknowledged through the secondary file organization architecture, a method or module for duplicating (and/or using parity algorithms) to provide additional protection against the other uses of the storage device from overwriting/deleting data stored in otherwise-unutilized space used by the secondary file organization architecture, a method or module for detecting and indicating that part or all of a collection of data previously written to otherwise-unutilized space was overwritten or removed, a method or module for taking one or more action(s) as a result of detecting that part or all of a collection of data previously written to otherwise-unutilized space was overwritten or removed, a method or module for identifying or identifying and utilizing reserve spare discrete units of memory, a method or module for identifying patterns of storage device use and optionally adjusting the operation of other modules and/or methods accordingly, a method or module for identifying failing or otherwise at-risk portions of storage space and optionally adjusting the operation of other modules or methods accordingly, and/or a method or module for modifying (such as updating or reconfiguring), in response to external stimuli, one or more other systems methods, or modules to perform any of the other methods and systems in a different fashion, and/or to add additional methods.

As described in greater detail below, in some implementations, the secondary file organization architecture controller 106 may be embedded in an operating system kernel of a host system. In some implementations, the secondary file organization architecture controller 106 may be embedded in a driver of a host system. In some implementations, the secondary file organization architecture controller 106 may be embedded in an application program running on a host system. In some implementations, the secondary file organization architecture controller 106 may operate at the storage device firmware level. In some implementations, the secondary file organization architecture controller 106 may include a hardware component invoked by firmware of storage device 136. In some implementations, multiple secondary file organization controllers may exist, and may operate with access to different levels of abstraction of the storage space. Note that storage device 136 can include one or more local or remote storage devices.

The method and system can be implemented at the host level by introducing instructions executed by one or more processors and accompanying hardware at the host-level which communicate with the physical or virtual storage device, and/or can be implemented at the storage device level by introducing hardware, or introducing software onto existing hardware, which executes instructions in order to directly interact with the physical storage medium without the need for the host system(s) to be aware of said introduced/modified hardware or the instructions executed therein, and/or can be implemented using a hardware interface device which sits between the host system(s) and the physical storage medium and is opaque or semi-opaque to the host system(s) and physical storage medium.

The method and system operating at a host level can be implemented at one or more level(s) of the host system(s), including but not limited to the kernel, one or more drivers responsible for communication with the storage device, the operating system, or an application running in either privileged or unprivileged mode on said operating system (operated by either the system itself or a particular user or pseudo-user of the system) or on a nested operating system. Depending on the level(s) of the host system(s) at which the method and system operate, the presence and operation of the method and system may be opaque, semi-opaque, or transparent to other level(s) of the host system(s).

The method and system operating at a storage-device-level can be implemented at one or more level(s) of the storage device, including but not limited to the device's standard firmware, one or more hardware components invoked directly or indirectly by the device's firmware, and/or a controller operating between the host system(s) and the device's standard firmware.

The method and system operating at a hardware-interface-device-level can be implemented at some or all level(s) of the discrete device which acts as an intermediate opaque or semi-opaque device between the host system and storage device itself. Non-limiting examples and implementations are described below.

In some implementations, system 102, remote computing platform(s) 104, and/or external resources 134 may be operatively linked via one or more communication links. For example, such communication links may be established, at least in part, via a network such as the Internet and/or other networks. It will be appreciated that this is not intended to be limiting, and that the scope of this disclosure includes implementations in which system 102, remote computing platform(s) 104, and/or external resources 134 may be operatively linked via some other communication media. As noted above, storage device 136, can be local or remote with respect to other elements of the system.

A given remote computing platform 104 may include one or more processors configured to execute computer program modules. The computer program modules may be configured to enable an expert or user associated with the given remote computing platform 104 to interface with system 102 and utilize system 102, in the manner described in the use cases below, for example. By way of non-limiting example, the given remote computing platform 104 may include one or more of a desktop computer, a laptop computer, a handheld computer, a tablet computing platform, a NetBook, a Smartphone, a gaming console, an IoT device, and/or other computing platforms.

External resources 134 may include sources of information outside of system 102, external entities participating with system 102, and/or other resources, as described in greater detail below. In some implementations, some or all of the functionality attributed herein to external resources 134 may be provided by resources included in system 102.

System 102 may include data storage device 136, one or more processors 138, and/or other components. System 102 may include communication lines, or ports to enable the exchange of information with a network and/or other computing platforms. Illustration of system 102 in FIG. 1 is not intended to be limiting. System 102 may include a plurality of hardware, software, and/or firmware components operating together to provide the functionality attributed herein to server(s) 102. For example, System 102 may be implemented by a cloud of computing platforms operating together as system 102. Storage device 136 may comprise non-transitory storage media that electronically stores information. The electronic storage media of storage device 136 may include one or both of system storage that is provided integrally (i.e., substantially non-removable) with system 102 and/or removable storage that is removably connectable to system 102 via, for example, a port (e.g., a USB port, a firewire port, etc.) or a drive (e.g., a disk drive, etc.). Storage device 136 may include one or more of optically readable or readable and writable storage media (e.g., optical disks, etc.), magnetically readable or readable and writable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable or readable and writable storage media. Storage device 136 may include one or more virtual storage resources (e.g., cloud storage, a virtual private network, and/or other virtual storage resources). Storage device 136 for its operation serving the primary file organization controller may store software algorithms, information determined by processor(s) 138, information received from system 102, information received from remote computing platform(s) 104, and/or other information that enables server(s) 102 to function as described herein.

Processor(s) 138 may be configured to provide information processing capabilities in system 102. As such, processor(s) 138 may include one or more of a digital processor, an analog processor, a digital circuit designed to process information, an analog circuit designed to process information, a state machine, and/or other mechanisms for electronically processing information. Although processor(s) 138 is shown in FIG. 1 as a single entity, this is for illustrative purposes only. In some implementations, processor(s) 138 may include a plurality of processing units. These processing units may be physically located within the same device, or processor(s) 138 may represent processing functionality of a plurality of devices operating in coordination. Processor(s) 138 may be configured to execute the modules and/or other modules by software; hardware; firmware; some combination of software, hardware, and/or firmware; and/or other mechanisms for configuring processing capabilities on processor(s) 138. As used herein, the term "module" may refer to any component or set of components that perform the functionality attributed to the module. This may include one or more physical processors performing execution of processor readable instructions, the processor readable instructions, circuitry, hardware, storage media, or any other components.

It should be appreciated that although the modules as being implemented within a single processing unit, in implementations in which processor(s) 138 includes multiple processing units, one or more of the modules may be implemented remotely from the other modules. The description of the functionality provided by the different modules described herein is for illustrative purposes, and is not intended to be limiting, as any of modules may provide more or less functionality than is described. For example, one or more of the modules may be eliminated, and some or all of its functionality may be provided by other ones of. As another example, processor(s) 138 may be configured to execute one or more additional modules that may perform some or all of the functionality attributed to one of the described modules.

Figure 2:
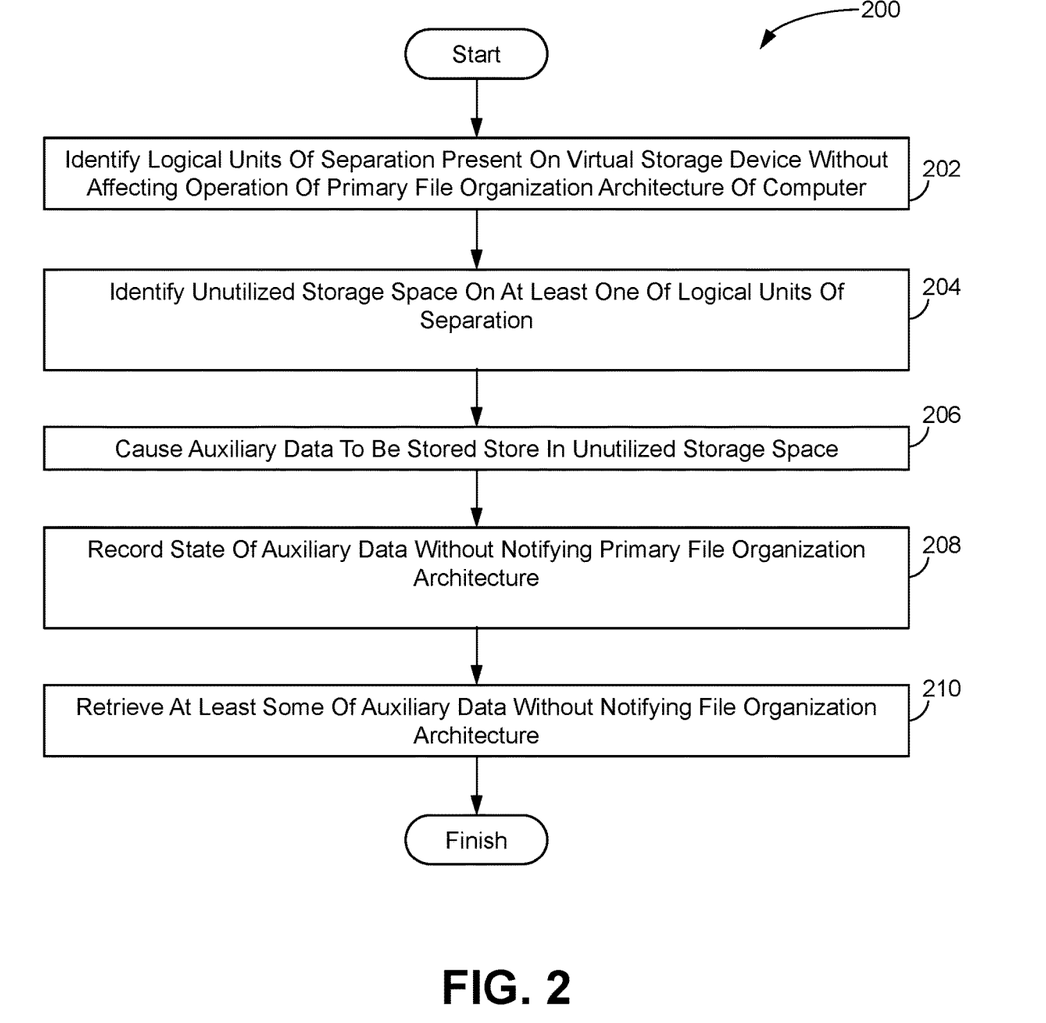
FIG. 2 illustrates a method for using the otherwise-unutilized storage space on a storage device in accordance with one or more implementations.

FIG. 2 illustrates one implementation of a method 200 for using the otherwise-unutilized storage space on a storage device without substantially affecting normal operation of the storage device by a user accessing the storage device through a primary file organization architecture of the storage device. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium or otherwise. The one or more processing devices may include one or more devices configured through hardware, firmware, and/or software to be specifically designed for execution of one or more of the operations of method 200.

An operation 202 may include identifying, by a secondary file organization architecture controller 106, logical units of separation present on the virtual storage device without affecting operation of the primary file organization architecture of the computer. Operation 202 may be performed by one or more hardware processors configured by machine-readable instructions including a module that is the same as or similar to unit identifying module 108, in accordance with one or more implementations.

An operation 204 may include identifying, by the secondary file organization architecture controller 106, unutilized storage space on at least one of the logical units of separation. Operation 204 may be performed by one or more hardware processors configured by machine-readable instructions including a module that is the same as or similar to storage space identifying module 110, in accordance with one or more implementations.

An operation 206 may include causing auxiliary data to be stored in the unutilized storage space. Operation 206 may be performed by one or more hardware processors configured by machine-readable instructions including a module that is the same as or similar to data storing module 112, in accordance with one or more implementations.

An operation 208 may include recording, in a data storage associated with the secondary file organization architecture 106, the state of the auxiliary data without notifying the primary file organization architecture. Operation 208 may be performed by one or more hardware processors configured by machine-readable instructions including a module that is the same as or similar to state recording module 114, in accordance with one or more implementations.

An operation 210 may include retrieving at least some of the auxiliary data without notifying the file organization architecture. Operation 210 may be performed by one or more hardware processors configured by machine-readable instructions including a module that is the same as or similar to data retrieval module 116, in accordance with one or more implementations.

Hardware of system 102 may be configured (directly or indirectly) using executable instructions to read data from the storage device 136 which describes the partitions present on the disk (such as a partition table) and/or to read data from the storage device regarding other logical segments of the device including unallocated space, nested partition tables (such as those available in a virtual machine disk stored within the host's file system(s)), etc., interpreting said acquired data, and recording or otherwise communicating the result.

The implementation may vary depending on the level(s) of the relevant system(s) at which this function is accomplished. If this function runs at a level that provides direct access to the data on the device, then the implementation may be acquiring and interpreting partition table/map information, which may be in a variety of formats including but not limited to GUID Partition Table (GPT), Master Boot Record (MBR), or Apple Partition Map (APM)). If this function runs at a level that provides information regarding the storage device at a higher level than the partition tables/maps themselves, then this higher-level data (such as a driver-provided enumeration of available partitions and their relevant sizes/properties) will be acquired and interpreted. Additionally, nested file systems available on the device (like disk images or virtual machine disks) which appear as fully allocated space to the top-level file system may also be interpreted, and the space within them may also be unused by the primary file organization structure.

Hardware of system 102 can be configured (directly or indirectly) using executable instructions to identify unutilized space on each of the one or more said partitions and/or other logical segments involving: reading data from the storage device which corresponds to the file system(s) present on partition (or similar analogous structure(s) in the case of a non-partition logical segment) in question; interpreting the data which corresponds to the file system(s) or file system analogue(s); constructing a partial or complete set of memory address(es) which reference discrete units of memory which do not contain data which the primary file system(s) or primary file system analogue(s) presently maintains a reference to; and returning/storing said partial or complete set of memory address(es) in some fashion. The implementation of this step varies depending on the level(s) of the relevant system(s) at which this step operates, as well as the attributes of the storage device(s) involved. If direct access to the raw data on the device is available, then file system structure and organization data may be read and interpreted directly. If access to file system data is not directly available, then higher-level information regarding free space on the device will be acquired and interpreted instead (and an implementation limited to higher-level interactions with the device may require additional steps to allocate data using the local file system(s) themselves rather than subverting them, and may optionally need to proactively delete its consumed storage space in response to higher-priority uses of the data, because the filesystem will consider this space unavailable). In the special case of unassigned storage space which is devoid of any file system or file system analogue, the partition table or partition map of the storage device itself is referenced instead.

Hardware of system 102 can be configured (directly or indirectly) using executable instructions to communicate with and acquire from one or more data providing external resources 134 (including but not limited to one or more remote services accessible via networking either through the networking capabilities of the host system(s) to which the storage device is attached to or networking capabilities local to the storage device including but not limited to: one or more embedded Wi-Fi communication devices, one or more embedded cellular network communication devices, or one or more hardwired network adapters, one or more other local storage devices, one or more other partitions on the storage device, other portions of the partition in question, or one or more data generator hardware and/or software systems which themselves may or may not require direction from one or more external data providers) an appropriate quantity of data. The implementation of this step varies depending on the level(s) of the relevant system(s) at which this step operates. Particularly, the availability of data providers or manner of communicating with data providers will be different at a system software level (such as the operating system, system-level programs, user-level programs, nested operating systems, etc.) than at a device-interface or device level (which may not provide access to the host machine(s) networking connections, other storage devices connected to the host machine(s), etc.).

Hardware of system 102 can be configured (directly or indirectly) using executable instructions to choose one or more of the previously identified unit(s) of unutilized space on one or more of the previously identified existing partitions, and sending one or more commands or otherwise configuring hardware (either directly or indirectly) using executable instructions to perform one or more instructions which result in the writing of said some or all acquired data to said identified otherwise-unutilized storage space. The implementation of this step depends on the level(s) of the relevant system(s) at which this step (or the embodiment in general) operates.

One or more records can be created or updated, by secondary file management architecture controller 106, to reflect the storage location and optional additional metadata of some or all of said acquired data can be: 1. finding or creating references to, by hard-coded and/or configurable memory pointers to one or more volatile or non-volatile memory locations (either through direct addresses, or addresses which require additional translation by software and/or hardware) on one or more local and/or remote storage devices, the location(s) of one or more records which represent the present, last-known, and/or past state(s) of the data written to said otherwise-unutilized storage space and, if applicable, other information regarding the storage of data on otherwise-unutilized storage location(s) on local or remote physical or virtual storage devices, which can be used to recover, or attempt to recover, the data stored in otherwise-unutilized space, 2. reading and interpreting (if applicable), by configuration of hardware, directly or indirectly, to execute one or more instructions, said records regarding data stored in otherwise-unutilized space, and 3. writing, by configuration of hardware, directly or indirectly, to execute one or more instructions, data in order to establish or update said records to represent the current state of the data stored in said otherwise-unutilized storage space such that retrieval of said stored data is made possible.

As noted above, the retrieving and maintaining of some or all of the data pointed to by the one or more records can include one or more processes at the storage device level, one or more hardware interface levels, and/or one or more software levels including but not limited to kernels, operating systems, drivers, system-level applications and/or user applications which may be optionally nested in virtualized environments, which provide for some or all of the data stored in said otherwise-unutilized storage space to be accessed by external processes, to be started or to continue operation. This access can occur in a variety of forms, including but not limited to, scheduled outbound requests from one or more started or maintained processes to other processes or services, directly or indirectly, to acquire and respond to queries, and/or the acceptance of and response to inbound queries to said one or more started or maintained processes.

Each query can take one or more of the following unexhaustive list of forms: request for the existence of one or more pieces of data stored in otherwise-unutilized space, request for the retrieval of one or more pieces of data stored in otherwise-unutilized space, and/or request for metadata regarding one or more pieces of data stored in otherwise-unutilized space. The response to a query requesting information regarding the existence, state, or metadata of one or more pieces of stored data can be implemented by finding and interpreting said one or more records regarding said stored data present in or through the secondary file organization architecture. The response to a query requesting one or more pieces of stored data to be returned can be implemented by finding and interpreting said one or more records regarding said stored data in the secondary file organization architecture, following one or more memory address references stored in and/or calculated from data stored in said one or more records, reading one or more segments of data stored at the storage location(s) described by the one or more memory address references, and assembling, if necessary, said data segments to form one or more files or other data structures requested by queries. In the event that a failure of any type occurs (including but not limited to being unable to retrieve one or more pieces (or sub-pieces) of data due to it being overwritten (such as during normal operation of the storage device, often but not always as the result of interactions with the device through one or more primary file organization architectures associated with the normal operation of the storage device), encountering an unexpected hardware and/or software failure, one or more pieces (or sub-pieces) of data being unintelligible or corrupted), a response may consist of an error message, parts of the requested data, records, or metadata that were accessible, etc. depending on the capabilities of the implementation, the configuration of the implementation, and/or the preferred error handling technique specified by the generator(s) of the query. In the event that an error handling technique is present, one or more pieces (or sub-pieces) of unintelligible, corrupted, or overwritten data may be recovered by reading one or more other pieces of data, and may further include processing the newly-read one or more other pieces of data, in order to retrieve or reproduce the one or more pieces or sub-pieces of data stored through the secondary file organization architecture which were initially unintelligible, corrupted, or overwritten.

Recognizing and responding to incoming writes (or erases, or other state-modifying commands based on the level of storage abstraction at which the method operates) to otherwise-unutilized space consumed by data written to said unutilized space can include detecting that a write (or erase, or other state-modifying command) is about to occur which will result in one or more discrete units of previously-otherwise-unutilized space according to the primary file storage architecture which currently contain data to be overwritten according to the secondary file storage architecture, and then optionally executing one or more additional instructions in response to the detection of an incoming write (or erase, or other state-modifying command). Different implementations of this step may have the ability to block the write (or erase, or other state-modifying command) from occurring for a period of time, may be able to copy the data that will be overwritten to another location and update records accordingly, and/or may be able to alter the functionality of one or more other modules and/or methods for purposes including but not limited to indicating that this data is no longer available, indicating that the data has been relocated, and/or indicating that an impending write (or erase, or other state-modifying command) has been temporarily blocked. When operating above the driver (such as by other instructions being executed within the context of an operating system or similar), this step may involve the injection of one or more instructions into the driver and/or configuration of the driver to provide the implementation of this step the ability to delay writes (or erases, or other state-modifying commands) initiated by other software which interacts with the driver independently of the software comprising the implementation of this step. When operating at the driver level, this step may be invoked by some or all write (or erase, or other state-modifying) operations the driver is instructed to perform. When running at a hardware interface layer, this step may detect and delay incoming writes (or erases, or other state-modifying commands), perform one or more queries against the connected storage device depending on the step's configuration (such as checking for data at the location(s) affected by the incoming state-modifying commands, moving data in these locations, etc.), and then perform the previously-delayed incoming state-modifying commands. When operating at the firmware level, this step may be invoked by some or all write (or erase, or other state-modifying) operations the device the firmware is running on is instructed to perform. This step may also be implemented using executable instructions which operate at more than one level and which are able to coordinate with the other levels at which related executable instructions are operating.

Duplicating (and/or using parity algorithms) to provide additional protection against the other uses of the storage device from overwriting/deleting data stored in otherwise-unutilized space can include writing additional data to additional otherwise-unutilized storage space which provides for redundancy of data which has already been or will be stored in otherwise-unutilized space, possibly including but not limited to copying one or more sections of the data to said additional otherwise-unutilized storage space or generating some sort of data as a function of the existing data for which redundancy is to be provided to and storing said generated data in said additional otherwise-unutilized storage space, and then updating or creating records which reflect the storage location(s) of the stored redundancy data, along with (if necessary) additional information required or helpful for using the redundancy data in the event that some or all of the original data is overwritten. Different implementations of this step may be invoked by the step in which data to be written to otherwise-unutilized space (or any other pending instruction(s) which result in the modification of the state of the otherwise-unutilized space) is acquired and/or written to offer redundancy to said data at the time of acquisition or initial writing/state-modification or invoked separately to offer redundancy to data which has already been written previously. Furthermore, different implementations of this step may offer the ability to only be performed on certain types of data and/or be performed only in certain situations (such as particular quantities of available otherwise-unutilized space being available, particular pieces of data being more or less important than others, maintaining particular performance characteristics for uses of the storage device relevant to the use of the device by the primary file organization architecture, etc.).

Detecting and indicating that part or all of a data structure previously written to otherwise-unutilized space was overwritten or removed can include determining whether particular data stored in previously-otherwise-unutilized space has been overwritten by other data (potentially but not necessarily belonging to the normal file system) or otherwise modified/deleted, and indicating that some or all of the data has been overwritten by updating one or more existing records in the secondary file organization architecture which refer to one or more discrete pieces of data which comprise the partially or completely overwritten data structure, creating a new record which indicates the partial or complete overwrite of the data structure, and/or altering the operation of one or more other modules and/or methods such that additional steps may be taken in response to the overwriting, including but not limited to reacquiring part or all of the data structure from one or more data providers/generators for storage, reconstitution of parts or all of the data structure from available redundancy data, and/or sending an alert or other indicating communication to one or more external services. Some implementations of this step may detect data has been overwritten proactively (such as a service that checks on the current status of the data structure(s) pointed to by one or more records stored in the secondary file organization architecture of data stored in otherwise-unutilized space), and others may function reactively (such as being called right before the data referred to by one or more records stored in the secondary file organization architecture is about to be read). Furthermore, various implementations of this step may detect that the data has changed in a variety of different ways, including but not limited to checking data stored in particular locations against checksums, parity bits, or similar constructs stored in records, interpreting the file system(s) available on the partition(s) in question and searching through them, comparing the data stored to the expected data or an expected pattern/format for the data including but not limited to a checksum, and/or accessing and interpreting logs regarding previous operations (such as writes, erases, or other state-modifying commands) that occurred.

Taking one or more action(s) as a result of detecting that part or all of a data structure previously written to otherwise-unutilized space was overwritten or removed, in response to the successful detection that part or all of a data structure has been overwritten or is otherwise no longer available, performing one or more actions including but not limited to reconstructing part or all of said data structure using available redundancy data, requesting a new copy of some or all of the data of said data structure and storing it in other otherwise-unutilized space, sending one or more alerts or similar informative messages to external services communicating that the data structure is no longer or only partially available.

Identifying or identifying and utilizing reserve spare discrete units of memory can include identifying storage capacity that is generally inaccessible and held in reserve to replace failing or inoperable sections of normal storage capacity or is reserved for other reasons such as caching to improve storage device performance for the primary use of the storage device, and to optionally change the operation of one or more other modules and/or methods to make knowledge and access to said reserve spare discrete units of memory available for use.

Identifying patterns of storage device use and optionally adjusting the operation of other modules can include identifying patterns of use for the storage device or one or more particular partitions, sections, or other manners of logical distinction (including but not limited to sampling the device's current utilization at one or more intervals, accessing logs regarding past device utilization, checking logs or storage capacity to see if particular data has changed since a previous point in time, and/or interpreting the file system (s) or other metadata to determine the last time particular data structures were modified), and optionally changing the operation of one or more other modules and/or methods to adjust their operation in response to any identified patterns. Various implementations of this step may alter behavior of other modules and methods in ways including but not limited to the following: increasing or decreasing the amount of redundancy used when storing data in otherwise-unutilized data, whitelisting or blacklisting particular sections of the storage device for use of otherwise-unutilized storage space to store data, limiting the timeframes in which some or all other methods and modules are able to run, and/or enabling or disabling particular features of other methods or modules which impact one or more performance characteristics of the storage device.

Identifying failing or otherwise at-risk portions of storage space and optionally adjusting the operation of other modules can include identifying one or more failing or otherwise at-risk portions of otherwise-unutilized storage space and/or utilized storage space (in ways including but not limited to accessing S.M.A.R.T. and other health-reporting tools of the storage device or a subsection thereof in question, attempting to read and/or write data from/to one or more discrete units of storage space and checking for errors or unexpected delays, and/or finding and interpreting logs regarding the health and/or behavior history of the device or a subsection thereof in question), and to optionally change the operation of one or more other modules or methods in ways included but not limited to the following: copying or moving some or all of the data stored at-risk storage to lower-risk storage and updating some or all relevant records accordingly, and/or sending one or more warnings and/or other messages to external services to communicate the potential future failure of the at-risk storage space and/or the data structure(s) stored therein.

Modifying (such as updating or reconfiguring), in response to external stimuli, one or more other modules can include acquiring desired changes to the functionality of one or more other modules or methods (through being called with the desired changes or a representation thereof, and/or accessing one or more external service(s) to inquire about desired changes), and to apply the desired changes by altering the instructions, and/or data used by the instructions, which are executed by the desired-to-be-updated one or more modules or methods.

In one implementation, secondary file organization architecture controller 106 includes a hardware interface device connected between storage device 136 and other elements of system 102 (the "host machine") which communicates with the storage device 136 through the hardware interface device as an intermediary. For example, a (likely low-cost) computing device can serve as at least part of the hardware interface device which can execute arbitrary instructions in an executable language, and can view and interpret incoming device-level commands from the host machine. The hardware interface device can alter, translate, and/or delay these commands, and insert its own device-bound commands when desired (sometimes but not always in response to one or more commands sent by the host machine), communicate with one or more external resources 134 (such as the host system itself, external hosts available through an embedded Wi-Fi and/or cellular network communication device, etc.) to acquire data to store in the otherwise-unutilized space on the connected storage device and/or to acquire instructions to generate said data, and/or to receive and respond to queries regarding previously-stored data on the otherwise-unutilized space on the connected storage device.

The hardware interface device can be configured with complete, partial, or nonexistent transparency to the host system depending on the particular operation characteristics desired of the device. Such a device may optionally implement one or more additional steps beyond the required steps for baseline operations of the implementations disclosed herein, allowing it to further function as a data redundancy device (for automatically duplicating or otherwise providing redundancy for data stored on the device by the host), a security mechanism (for blocking, altering, duplicating the affected data of, or otherwise responding to potentially malicious writes to a storage device [such as ones which appear to be maliciously encrypting data, corrupting the file system, or otherwise maliciously interacting with the data on the storage device]), a health monitor system (for logging errors, faults, unexpected performance drops, etc. without requiring software to be available and running at the host system level), improve the performance of the storage device, and more.

The hardware interface device could be installed and used by a user and/or by a manufacturer. Since the device is optionally completely opaque to both the storage device 136 and the host device, the host device and the storage device 136 do not necessarily know that the hardware interface device exists. It is also possible to have more than one hardware interface device between the host and the storage device 136.

In another implementation, secondary file organization architecture controller 106 includes a storage device driver installed on an operating system running on the host computing device. This storage device driver is comprised of a series of executable instructions which configure the host machine executing the operating system on which the driver is installed. The driver is the liaison between most or all OS-level and above interactions with a particular virtual or physical storage device, and can view and interpret incoming commands for storing and/or retrieving data to/from the storage device, optionally alter, translate, and/or delay these commands, and insert its own device-bound commands when desired (sometimes but not always in response to one or more commands sent by the host machine). The storage driver can behave in several different ways, including but not limited to: using the underlying filesystem directly to store files in otherwise-unutilized space and only provide an incomplete interpreted view of the filesystem when queried (and keep track of which files/data structures are not known by the operating system and it's processes through the primary file organization architecture, and allow these files/data structures to be overwritten as if they were empty space by the operating system and its processes through understanding of only the primary file organization architecture), or provide direct and full access to the underlying filesystem, and use otherwise-unutilized space on the device without updating records in the primary filesystem(s) accordingly (similar to how other implementations of the invention herein disclosed function when operating at a lower level than the driver). The driver can communicate with one or more external data providers (such as other processes running on the host operating system, external hosts available through hardwired and/or Wi-Fi and/or cellular network communication functionality available through the operating system, data stored on the storage device through the primary file organization architecture, etc.) to acquire data to store in the otherwise-unutilized space on the connected storage device and/or to acquire instructions to generate said data, and/or to receive and respond to queries regarding previously-stored data on the otherwise-unutilized space on the connected storage device.

The driver can be configured with complete, partial, or nonexistent transparency of its operations to the operating system and its processes depending on the particular operation characteristics desired of the driver. The driver may further function as a data redundancy driver (for automatically duplicating or otherwise providing redundancy for data stored on the device by some or all processes on the operating system, and/or duplicating or otherwise providing redundancy for data stored in a particular fashion or of a particular type), a security mechanism (for blocking, altering, duplicating the affected data of, or otherwise responding to potentially malicious writes to a storage device [such as ones which appear to be maliciously encrypting data, corrupting the file system, or otherwise maliciously interacting with the data on the storage device]), a performance enhancing mechanism, or the like.

A variety of use cases are possible for the implementations discussed herein. Some examples are discussed below.

Blockchain Proof-of-Capacity Mining: Some party generates and stores and/or pre-fills the storage device with plots for PoC mining, and uses them to secure blockchains (and, in some PoC systems, earn consideration) for performing PoC mining. Non-blockchain Proof-of-Capacity applications can also be used as anti-spam mechanisms, or in a non-blockchain system where provable consumption of storage device space is desirable.

File Storage: Some party acquires files which they or some other party want stored (possibly files that are part of a blockchain network, or files that users of a blockchain network want stored and are willing to pay for the storage of).

Local Redundancy: So long as the hard drive has extra capacity, that extra capacity is filled up with redundant copies (or some other type of data which aids in recovery) of other data stored on the device (think of a RAID-like system existing on a single disk).

Other Redundancy: Similar to the local redundancy option, except data might be from other drives connected to the host machine, other devices on the same network, etc.

As a Cache: Data which is commonly accessed from other (possibly slower or busier) devices can be cached out to spare storage capacity on a faster/less busy drive, and it can behave as a cache (and when a cache miss occurs, the version is simply pulled from the slower/busier device).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Glossary

A "storage device" is a physical or virtual device to which data can be written to and read from. Physical storage devices are physical hardware which contain one or more addressable discrete units of (often (but not necessarily) non-volatile) memory. Virtual storage devices are comprised of one or more portions of one or more physical and/or virtual storage devices combined through one or more layers of abstraction such that access to the virtual storage device can be made in a similar fashion to access to a physical device. Examples of a physical storage device include but are not limited to: magnetic hard drive, solid-state hard drive, floppy disk, tape drive, RAM-disc, CD disc, DVD disc, Blu-ray disc, flash memory drive, flash memory card, EPROM, EEPROM, PROM, Mask ROM, DRAM/SRAM/SDRAM. Examples of a virtual storage device include but are not limited to other physical or virtual storage devices in RAID- or RAID-like arrays and/or virtualized storage devices which use non-volatile or volatile memory (such as a RAM-Disk (virtual storage on (generally volatile) Random Access Memory), and/or virtual and/or "logical" construct(s) on one or more other physical or virtual storage device(s) (such as an ISO or DMG file), and/or a disk image used for one or more virtual machines.

"Memory" is one or more discrete units of storage which can hold a bit (either a '1' (or on), '0' (or off), one or more other states which represent either an unknown/undefined state, multiple simultaneous states [particularly but not necessarily with regard to quantum computer devices]), and/or multiples of the aforementioned. Memory is used to store digital information comprised of an ordered or semi-ordered series of one or more bits or other discrete, atomic states. In this document, memory is used to refer to storage ability with or without rewrite ability in the general sense unless otherwise specified. When a discrete unit of storage or memory is referenced in this document, it refers to the smallest unit of memory which is addressable by the abstraction layer(s) at which the described method or system operates (for example, a physical storage device may be capable of reading/writing 1 KB pages individually, but may contain a filesystem which has a granularity of 8 KB, or 8 pages, so the disclosed systems and methods operating at the physical device level or the file system level will have different-sized discrete units of storage).

A "memory address" or "storage location" is an address that points to a discrete portion of memory. These addresses can exist in several forms, including Cylinder-Head-Sector (or CHS) values (which were originally related to the physical geometry of a magnetic hard disk or similar device, but which may instead correspond to an analogue of the device's physical geometry on modern devices utilizing CHS), Logical Block Addressing (or LBA) values (in which blocks [segments] of memory are addressed by their index, which generally starts at 0), or any other manner of representing (directly or through the use of one or more layers of translation) a portion of memory.

A "partition" is a logical section of a storage device. A storage device can be divided into one or more partitions, and each partition can be used for a different purpose. Often, storage devices are divided into several partitions to best support the operation and utility of the host system(s) which access the storage device.

A "partition table" or "partition map" is a table or map stored on the storage device which describes the partition(s) available on the storage device. Examples include but are not limited to Master Boot Record (MBR), GUID Partition Table (GPT), Apple Partition Map (APM). Modifications to the partitions on the disk (such as creating, resizing, or deleting) are reflected by updates to the partition table.

A "file organization architecture" refers to the logical units of separation (or partitions) on a storage device (physical or virtual), as well as the file system present on each logical unit of separation. File organization architectures can be nested (such as a VM having its own file organization architecture for its virtual disk(s), which is present on a storage device which has a higher-level file organization architecture present). Where possible, a file organization architecture should be interpreted to optionally include all nested file organization architectures.

A "file system reference" or "record" is a reference stored by a file system which describes a data structure (a file or other storage construct) stored on the partition the file system is operating on. The reference often contains meta-data regarding the data it points to (such as the time the data was last modified, the permissions of the data, etc.), in addition to the (generally ordered) memory pointers (directly or indirectly) to segments of memory in which the data of the file is stored. Note that several ordered or unordered distinct memory locations may be pointed to by a single file system reference.

"unused storage capacity" or "otherwise-unutilized storage" refers to discrete units of memory which the primary file organization architecture(s) on a device do not currently reference. Changes to the data present in the unused storage capacity will have no substantial effect on any protocol-adherent interpreter of the primary file organization architecture(s). While units of memory generally do contain data (whether it be all zeroes, random garbage, and/or data which was 'deleted' by removing all references to it according to the specifications of the primary file organization architecture(s) in question), this data is considered empty by the file system(s) because it does not store data that the primary file organization architecture(s) point to (although an interpreter of the one or more applicable primary file organization architecture(s) expects to be able to write data to unused storage capacity at any time, and modify the data of the primary file organization architecture(s) accordingly to represent that the previously-unused storage capacity is now used and accessible through one or more references stored by the primary file organization architecture(s)).

A "kernel" refers to software which runs at the highest privilege level of a system (or a subsystem). Generally, access to physical devices connected to a computer system must go through the kernel. Virtualized environments also often have their own kernel which runs at a lower privilege than the primary system kernel, or have limited direct access to the primary system kernel.

A "driver" refers to software which creates an interface, providing an abstraction layer to physical or virtual devices which other pieces of software can use without understanding some or all of the underlying mechanics of the physical or virtual device.

"firmware" refers to software which provides low-level control of the hardware of a device. For example, the firmware of a physical storage device has direct access to the physical components of the storage device.

What is claimed is:

1. A system configured for using the otherwise-unutilized storage space on a storage device without having a substantial effect on normal operation of the storage device by one or more users accessing the storage device through a primary file organization architecture controller which controls reads from, writes to, and/or other interactions with only a primary file organization architecture of the storage device, the primary file organization architecture including the data comprising the architecture's structure and the data structures of the primary file organization architecture, the system comprising a secondary file organization architecture controller that controls reads from, writes to, and/or other interactions with a secondary file organization architecture that is separate from and not visible to the primary file organization architecture but which may include portions of the storage device which overlap the primary file organization architecture, the secondary file organization architecture controller having an allocation table that is separate from an allocation table of the primary file organization architecture controller and the secondary file organization controller being defined by one or more hardware processors configured by machine-readable instructions to:
identify logical units of separation present on the virtual storage device without substantially affecting operation of the primary file organization architecture of the computer;
identify unutilized storage space on at least one of the logical units of separation based on the primary file organization architecture;
cause auxiliary data to be stored in the unutilized storage space;
record, in a data storage associated with the secondary file organization architecture module, the state of the auxiliary data without notifying the primary file organization architecture or the primary file organization architecture controller; and
retrieve at least some of the auxiliary data without notifying the primary file organization architecture or the primary file organization architecture controller.

2. The system of claim 1, wherein the primary file organization architecture of the storage device comprises an architecture of GUID, MBR, or APT, and wherein one or more of the partitions defined by the partition scheme contain a file system such as FAT, NTFS.

3. The system of claim 1, wherein the primary file organization architecture of the storage device is controlled by one or more operating system(s) of a user computing device.

4. The system of claim 1, wherein the storage device comprises one or more network attached storage architecture(s).

5. The system of claim 1, wherein the one or more hardware processors are further configured by machine-readable instructions to:
recognize incoming write, erase, or other state-modifying operations to the primary file organization architecture of the storage device;
respond to the write, erase, or other state-modifying operations.

6. The system of claim 1, wherein the one or more hardware processors are further configured by machine-readable instructions to at least one of, duplicate the auxiliary data or use parity algorithms to protect against overwriting, or modify the auxiliary data by primary file organization architecture of the storage device.

7. The system of claim 1, wherein the one or more hardware processors are further configured by machine-readable instructions to detect that at least one unit of memory containing a data structure previously containing the auxiliary data was overwritten, removed, or otherwise modified.

8. The system of claim 1, wherein the one or more hardware processors are further configured by machine-readable instructions to:
identify patterns of storage and/or other interactions of the primary file organization architecture and primary file organization architecture controller of the storage device;
adjust the operation of the secondary file organization architecture controller of the storage device based on the patterns of storage.

9. The system of claim 1, wherein the one or more hardware processors are further configured by machine-readable instructions to:
identify at-risk portions of storage space on the storage device;
adjust the operation of the secondary file organization architecture controller of the storage device based on the at-risk portions.

10. The system of claim 1, wherein the one or more hardware processors are further configured by machine-readable instructions to:
receive external indicators;
adjust the operation of the secondary file organization architecture controller of the storage device based on the external indicators.

11. The system of claim 1, wherein the secondary file organization architecture controller is embedded in an operating system kernel of a host system.

12. The system of claim 1, wherein the secondary file organization architecture controller is embedded in a driver of a host system.

13. The system of claim 1, wherein the secondary file organization architecture controller is embedded in an application of a host system.

14. The system of claim 1, wherein the secondary file organization architecture controller operates at the storage device firmware level.

15. The system of claim 1, wherein the secondary file organization architecture controller comprises a hardware component invoked by the storage device firmware.

16. A method of using the otherwise-unutilized storage space on a storage device without substantially affecting normal operation of the storage device by one or more users accessing the storage device through a primary file organization architecture controller of the storage device which controls reads from, writes to, and/or other interactions with only a primary file organization architecture of the storage device, the primary file organization architecture including the data comprising the architecture's structure and the data structures of the primary file organization architecture, the method comprising:
identifying, by a secondary file organization architecture controller separate from the primary file organization architecture controller, logical units of separation present on the virtual storage device without substantially affecting operation of the primary file organization architecture controller of the computer and the secondary file organization architecture controller having an allocation table that is separate from an allocation table of the primary file organization architecture controller;

identifying, by the secondary file organization architecture controller, unutilized storage space on at least one of the logical units of separation;

causing auxiliary data to be stored store in the unutilized storage space;

recording, in a data storage associated with the secondary file organization architecture, the state of the auxiliary data without notifying the primary file organization architecture or the primary file organization architecture controller; and retrieving at least some of the auxiliary data without notifying the primary file organization architecture or the primary file organization architecture controller.

17. The method of claim 16, wherein the primary file organization architecture of the storage device comprises an architecture a GUID, MBR, or APT, and wherein one or more of the partitions defined by the partition scheme contain a file system such as FAT, NTFS.

18. The method of claim 16, wherein the primary file organization architecture controller of the storage device is embedded in one or more operating system(s) of a user computing device.

19. The method of claim 16, wherein the storage device comprises one or more network attached storage architecture(s).

20. The method of claim 16, further comprising:
recognizing incoming write, erase, or other state-modifying operations to the primary file organization architecture (including the data comprising the architecture's structure and the data (files and/or other data structures) which the architecture's structure defines) of the storage device; and
responding to the write, erase, or other state-modifying operations.

21. The method of claim 16, further comprising at least one of duplicating the auxiliary data or using parity algorithms to protect against overwriting, modifying the auxiliary data by primary file organization architecture controller of the storage device.

22. The method of claim 16, detecting that at least one of the units of memory containing a data structure previously containing the auxiliary data was overwritten, removed, or otherwise modified.

23. The method of claim 16, further comprising:
identifying patterns of storage and/or other interactions of the primary file organization architecture and primary file organization architecture controller of the storage device; and
adjusting the operation of the secondary file organization architecture controller of the storage device based on the patterns of storage and/or other interactions.

24. The method of claim 16, further comprising:
identifying at-risk portions of storage space on the storage device; and
adjusting the operation of the secondary file organization architecture controller of the storage device based on the at-risk portions.

25. The method of claim 16, further comprising:
receiving external indicators; and
adjusting the operation of the secondary file organization architecture controller of the storage device based on the external indicators.

26. The method of claim 16, wherein the secondary file organization architecture controller is embedded in an operating system kernel of a host system.

27. The method of claim 16, wherein the secondary file organization architecture controller is embedded in a driver of a host system.

28. The method of claim 16, wherein the secondary file organization architecture controller is embedded in an application of a host system.

29. The method of claim 16, wherein the secondary file organization architecture controller operates at the storage device firmware level.

30. The method of claim 16, wherein the secondary file organization architecture controller comprises a hardware component invoked by the storage device firmware.

31. A non-transient computer-readable storage medium having instructions embodied thereon, the instructions being executable by one or more processors to perform a method for using the otherwise-unutilized storage space on a storage device without substantially affecting normal operation of the storage device by one or more users accessing the storage device through a primary file organization architecture controller while controls reads from, writes to, and/or other interactions with only a primary file organization architecture of the storage device, the primary file organization architecture including the data comprising the architecture's structure and the data structures of the primary file organization architecture, the method comprising:
identifying, by a secondary file organization architecture controller separate from the primary file organization architecture controller, logical units of separation present on the virtual storage device without substantially affecting operation of the primary file organization architecture controller and the secondary file organization architecture controller having an allocation table that is separate from an allocation table of the primary file organization architecture controller;
identifying, by the secondary file organization architecture controller, unutilized storage space on at least one of the logical units of separation;
causing auxiliary data to be stored in the unutilized storage space;
recording, in a data storage associated with the secondary file organization architecture, the state of the auxiliary data without notifying the primary file organization architecture or primary the file organization architecture controller; and
retrieving at least some of the auxiliary data without notifying the primary file organization architecture or primary file organization architecture controller.

32. The computer-readable storage medium of claim 31, wherein the primary file organization architecture of the storage device comprises an architecture a GUID, MBR, or APT, and wherein one or more of the partitions defined by the partition scheme contain a file system such as FAT, NTFS.

33. The computer-readable storage medium of claim 31, wherein the primary file organization architecture of the storage device is controlled by one or more operating system(s) of a user computing device.

34. The computer-readable storage medium of claim 31, wherein the storage device comprises one or more network attached storage architecture(s).

35. The computer-readable storage medium of claim 31, wherein the method further comprises:
recognizing incoming write, erase, or other state-modifying operations to the primary file organization architecture (including the data comprising the architecture's structure and the data (files and/or other data structures) which the architecture's structure defines) of the storage device; and responding to the write operations.

36. The computer-readable storage medium of claim 31, wherein the method further comprises at least one of duplicating the auxiliary data or using parity algorithms to protect against overwriting, or otherwise modifying the auxiliary data by primary file organization architecture controller of the storage device.

37. The computer-readable storage medium of claim 31, wherein the method further comprises detecting that at least one of the units of memory containing a data structure previously containing the auxiliary was overwritten or removed.

38. The computer-readable storage medium of claim 31, wherein the method further comprises:
    identifying patterns of storage and/or other interactions of the primary file organization architecture and primary file organization architecture controller of the storage device; and
    adjusting the operation of the secondary file organization architecture controller of the storage device based on the patterns of storage and/or other interactions.

39. The computer-readable storage medium of claim 31, wherein the method further comprises:
    identifying at-risk portions of storage space on the storage device; and
    adjusting the operation of the secondary file organization architecture controller of the storage device based on the at-risk portions.

40. The computer-readable storage medium of claim 31, wherein the method further comprises:
    receiving external indicators; and
    adjusting the operation of the secondary file organization architecture controller of the storage device based on the external indicators.

41. The computer-readable storage medium of claim 31, wherein the secondary file organization architecture controller is embedded in an operating system kernel of a host system.

42. The computer-readable storage medium of claim 31, wherein the secondary file organization architecture controller is embedded in a driver of a host system.

43. The computer-readable storage medium of claim 31, wherein the secondary file organization architecture controller is embedded in an application of a host system.

44. The computer-readable storage medium of claim 31, wherein the secondary file organization architecture controller operates at the storage device firmware level.

45. The computer-readable storage medium of claim 31, wherein the secondary file organization architecture controller comprises a hardware component invoked by the storage device firmware.

* * * * *